Dec. 2, 1958 D. P. WELLES, JR Re. 24,572

FLUTELESS SWAGING TAP

Original Filed April 3, 1956

INVENTOR.
DONALD P. WELLS JR.
BY
PARKER & CARTER
ATTORNEYS

United States Patent Office

Re. 24,572
Reissued Dec. 2, 1958

24,572

FLUTELESS SWAGING TAP

Donald P. Welles, Jr., Rockford, Ill., assignor to Besley-Welles Corporation, Beloit, Wis., a corporation of Illinois Original No. 2,807,813, dated October 1, 1957, Serial No. 575,733, April 3, 1956. Application for reissue November 14, 1957, Serial No. 696,582

3 Claims. (Cl. 10—152)

Matter enclosed in heavy brackets [ ] appears in the original patent but forms no part of this reissue specification; matter printed in italics indicates the additions made by reissue.

This invention relates to improvements in fluteless taps of the kind adapted for forming interior threads in ductile metal.

The principal object of the invention is to provide an improved form of fluteless tap which forms the internal threads by displacing or swaging the metal rather than by cutting, or otherwise displacing the metal.

The invention may best be understood by reference to the accompanying drawings, in which—

Figure 4:
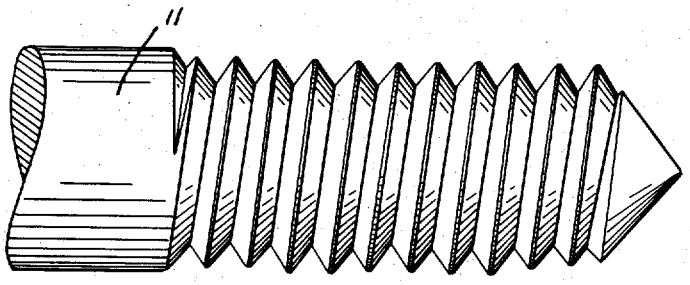
Figure 5:
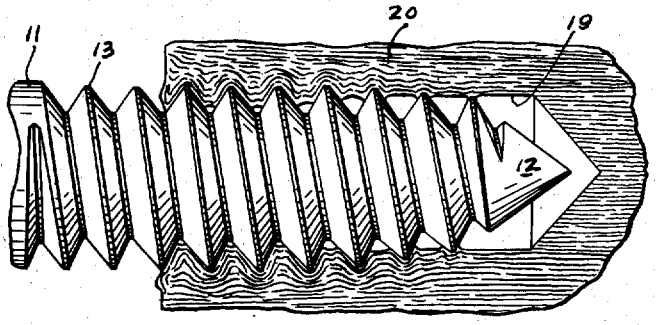

Figure 4 is a side view of a modified form of tap embodying my invention, having a thread of uniform diameter rather than having the first few threads of gradually reduced diameter as illustrated in the form of the preceding figures, and with left-hand rather than right-hand threads; and Figure 5 is a sectional view of a tap bore, showing in an exaggerated manner the swaging action of the tap in the bore.

Figure 1:
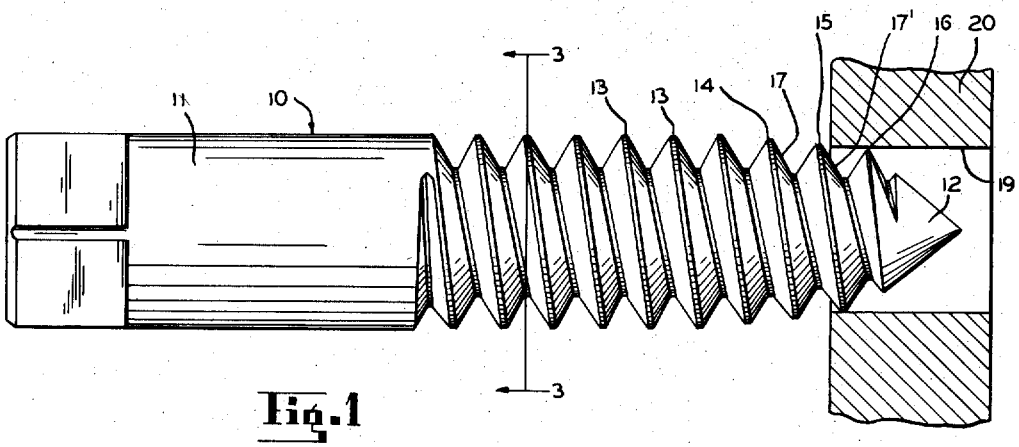
Figure 1 is a side view of a tap constructed in accordance with my invention, and illustrating the manner in which it is introduced into a smooth bore for threading the latter.
Figure 3:
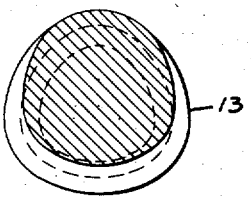
Figure 3 is a section taken on line 3—3 of Figure 1.
Figure 2:
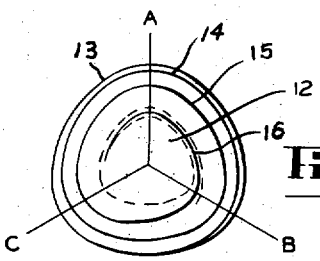
Figure 2 is an end view of the tap shown in Figure 1.

Referring now to details of the embodiment of the invention shown in Figures 1 to 3 inclusive, of the drawing, the fluteless tap indicated generally at 10 has a shank 11 of conventional cylindrical form in which the threads of the tap are formed at one end, terminating in a point 12 of conventional form. Several thread turns 13, 13' adjacent the shank are formed with a uniform maximum diameter which form the main thread-forming portion of the tap and determine the final shape of the thread in the work but a few of the thread turns 14, 15 and 16 are of gradually reduced diameter as they approach the point 12 so as to form, in effect, what is familiarly termed a tapered thread adjacent the point.

As will be seen from Figures 2 and 3, the thread turns of the tapered portion, and most, if not all, of the adjacent thread turns, are formed with varying outside, pitch and root diameters for each turn of the thread circumferentially of the tap. As seen in Figure 2, these variations in the three diameters mentioned are produced uniformly in three sectors A—B, B—C, and C—A of each thread turn by gradually decreasing these three diameters, which are at maximum size at radial line A, to a minimum diameter at a point approximately midway of said sector, and then gradually increasing these three diameters to the maximum size at line B. The same variation in diameters is then repeated for sectors B—C and C—A of each turn of the thread. For convenience, this variation in the outside, pitch and root diameters through each sector may be termed a "radial relief."

This "radial relief" of the several sectors can perhaps be clearly visualized by explaining that if the continuous thread were developed along a plane instead of circumferentially of the tap, the thread would follow a substantially sinuous curve relative to said plane.

In the illustrated form shown in Figures 1, 2 and 3, each turn of the thread has three sectors and the sectors of each turn are in axially registering relation to each other. It will be readily understood that the number of sectors for each turn of the thread may be varied, if desired, although in practice I find the three or four sectors are preferable.

It will be furthermore noted that the threads have a substantially uniform cross-section taken on any plane intersecting the axis of the tap, for the full length of the threaded portion of the tap. Thus, the thread is of substantially uniform V-shape in cross-section, excepting for minor differences in the widths of the thread flanks 17 and 17' due to the tapered end thread turns 14 and 15.

In the modified form of fluteless tap shown in Figure 4, the same form of relief is utilized in the thread turns, but in this instance all of the threads are maintained at a uniform maximum and minimum diameter throughout the threaded portion of the tap.

In practice I find an advantageous method of producing the novel form of thread above described is by means of a grinding operation, in which the grinding wheel is moved toward and away from the tap while the latter is being rotated relative to the grinding wheel.

In practice, my improved form of fluteless tap is preferably introduced in a previously bored hole 19 of a work piece indicated at 20, which hole is of substantially the same diameter as the final pitch diameter of the thread as indicated in Figures 1 and 5. The tap is then rotated so as to screw it into the hole. The internal threads are formed by displacing the metal with a swaging action, as illustrated in an exaggerated diagrammatic manner in Figure 5. It has been demonstrated that due to the novel form of the tap thread with its radial relief, an interior thread may be produced in the work with greater ease, and with much less torsional effort and generation of heat, than with a tap of corresponding size without the radial relief which characterizes my invention.

Although I have shown and described certain embodiments of my invention, it will be understood that I do not wish to be limited to the exact construction shown and described, but that various changes and modifications may be made without departing from the spirit and scope of the invention as defined by the appended claims.

I claim:

[1. A fluteless tap comprising a shank and a main thread-forming tap portion having a continuous thread formed with a series of successive radially relieved sectors circumferentially of the tap, and said thread being substantially uniform in cross section and of substantially equal depth taken in all planes intersecting the axis of said tap longitudinally thereof.]

[2. The structure of claim 1, wherein the radially relieved sectors of the thread have gradually increasing outside, pitch, and root diameters merging gradually into gradually decreasing outside, pitch, and root diameters.]

[3. The structure of claim 1, wherein successive turns of the thread have the same number of axially registering radially relieved sectors.]

[4. The structure of claim 1 wherein the tap also has a tapered end portion with successive sectors having gradually reduced outside, pitch and root diameters toward the extreme end of the tap.]

*5. A fluteless thread forming tool for threading a generally cylindrical surface, the tool having a cylindrical portion with a continuous thread formed with a series of successive radially relieved sectors circumferentially of the tool with gradually increasing outside, pitch, and root*

*diameters merging gradually into gradually decreasing outside, pitch, and root diameters, the thread being substantially uniform in cross section and of substantially equal depth taken in all planes intersecting the axis of said tool longitudinally thereof, a tapered threaded end portion on said tool of substantially full thread depth with successive sectors having gradually varying outside, pitch, and root diameters toward the extreme end of the tool, the extreme pitch diameter of the thread on the cylindrical portion being generally of the order of the diameter of the cylindrical surface to be threaded, the crest diameter of at least one of the threads toward the extreme end of the tapered portion being substantially the same as the pitch diameter of the cylindrical portion, the threaded end portion being a non-interrupted continuation of the continuous thread on the cylindrical portion.*

*6. The structure of claim 5 further characterized in that the radially relieved sectors on the cylindrical portion are axially aligned.*

*7. The structure of claim 5 further characterized in that successive turns of the thread have the same number of axially registering radially relieved sectors.*

References Cited in the file of this patent or the original patent

UNITED STATES PATENTS

| | | |
|---|---|---|
| 1,676,482 | De Lapotterie | July 10, 1928 |
| 1,922,689 | Linnenbruegge | Aug. 15, 1933 |
| 2,301,679 | Bouget | Nov. 10, 1942 |
| 2,352,982 | Tomalis | July 4, 1944 |
| 2,388,779 | Boehmler | Nov. 13, 1945 |
| 2,556,174 | Evans | June 12, 1951 |
| 2,703,419 | Barth | Mar. 8, 1955 |

FOREIGN PATENTS

| | | |
|---|---|---|
| 4,271 | Great Britain | Dec. 11, 1874 |
| 547,596 | Germany | Apr. 1, 1932 |